US005218838A

United States Patent [19]

Kitamoto et al.

[11] Patent Number: 5,218,838
[45] Date of Patent: Jun. 15, 1993

[54] AIR CONDITIONING APPARATUS WITH INDOOR UNITS INSTALLED ON CEILING AND FLOOR IN ROOM

[75] Inventors: Manabu Kitamoto, Shizuoka; Yasunori Ichikawa, Fuji; Keiichiro Shimizu, Fujinomiya; Eiji Kuwahara, Fuji; Masao Amano, Shizuoka; Masayuki Hibi, Fujinomiya; Keizo Iwata, Fuji, all of Japan

[73] Assignee: Kabushiki Kaisha Toshiba, Kawasaki, Japan

[21] Appl. No.: 872,894

[22] Filed: Apr. 23, 1992

[30] Foreign Application Priority Data

Apr. 26, 1991 [JP] Japan ............................... 3-97582
Aug. 2, 1991 [JP] Japan ............................... 3-194396

[51] Int. Cl.⁵ .............................................. F25B 13/104
[52] U.S. Cl. .................................... 62/288; 137/240; 62/285
[58] Field of Search ................ 62/285, 288, 291, 279, 62/80, 81; 137/240

[56] References Cited

U.S. PATENT DOCUMENTS

| 87,878 | 3/1869 | Schmid | 62/285 |
| 3,224,216 | 12/1965 | Crouch | 62/285 |
| 4,355,652 | 10/1982 | Perkins | 137/240 |
| 4,356,700 | 11/1982 | Eckels et al. | 62/50.7 |

FOREIGN PATENT DOCUMENTS

| 2-93620 | 7/1990 | Japan . |
| 2-93621 | 7/1990 | Japan . |
| 2254237 | 10/1990 | Japan . |

Primary Examiner—Albert J. Makay
Assistant Examiner—William C. Doerrler
Attorney, Agent, or Firm—Cushman, Darby & Cushman

[57] ABSTRACT

Two or more indoor units are provided on ceiling and floor of a room. Each of the indoor units has an air heat exchanger for cooling indoor air, and a drain pan for catching drainage produced by the air heat exchanger. A drain pipe is provided in the ceiling and under the floor. The drainage in each of the drain pans flows into the drainage pipe. The drain in the drain pipe is carried and discharged outdoor by a drain carrying unit.

2 Claims, 16 Drawing Sheets

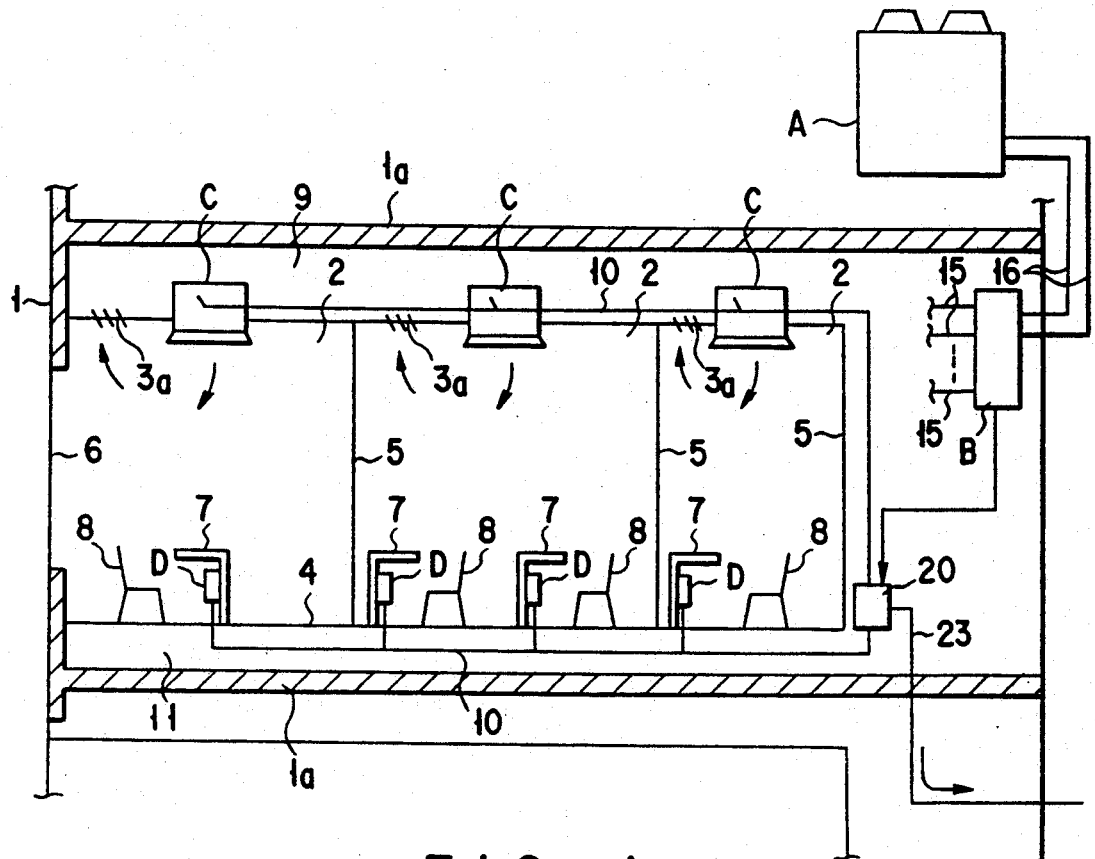
F I G. 1
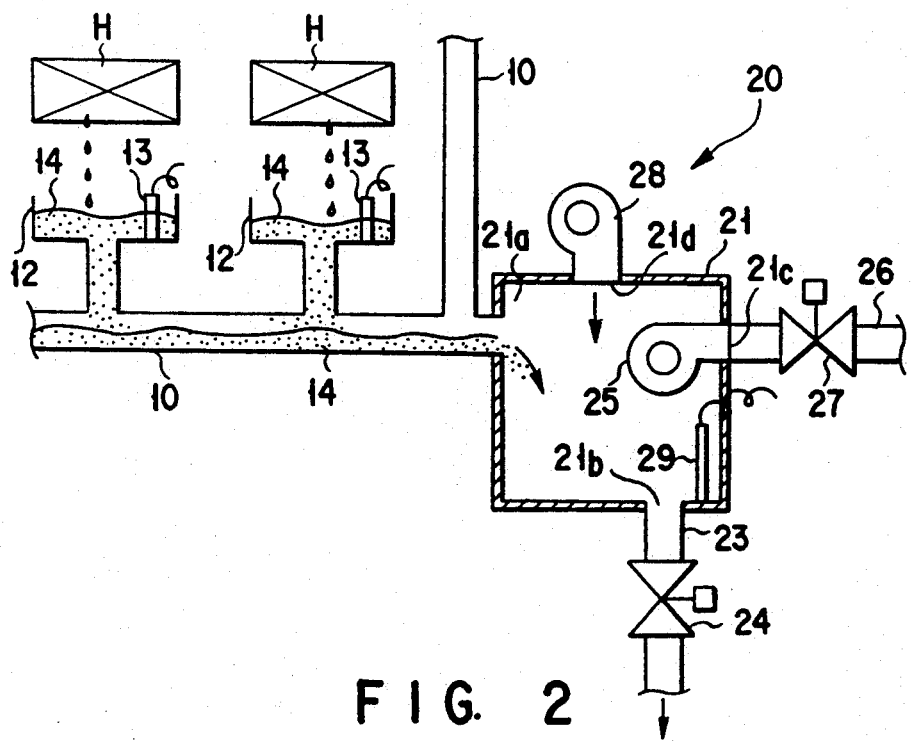
F I G. 2

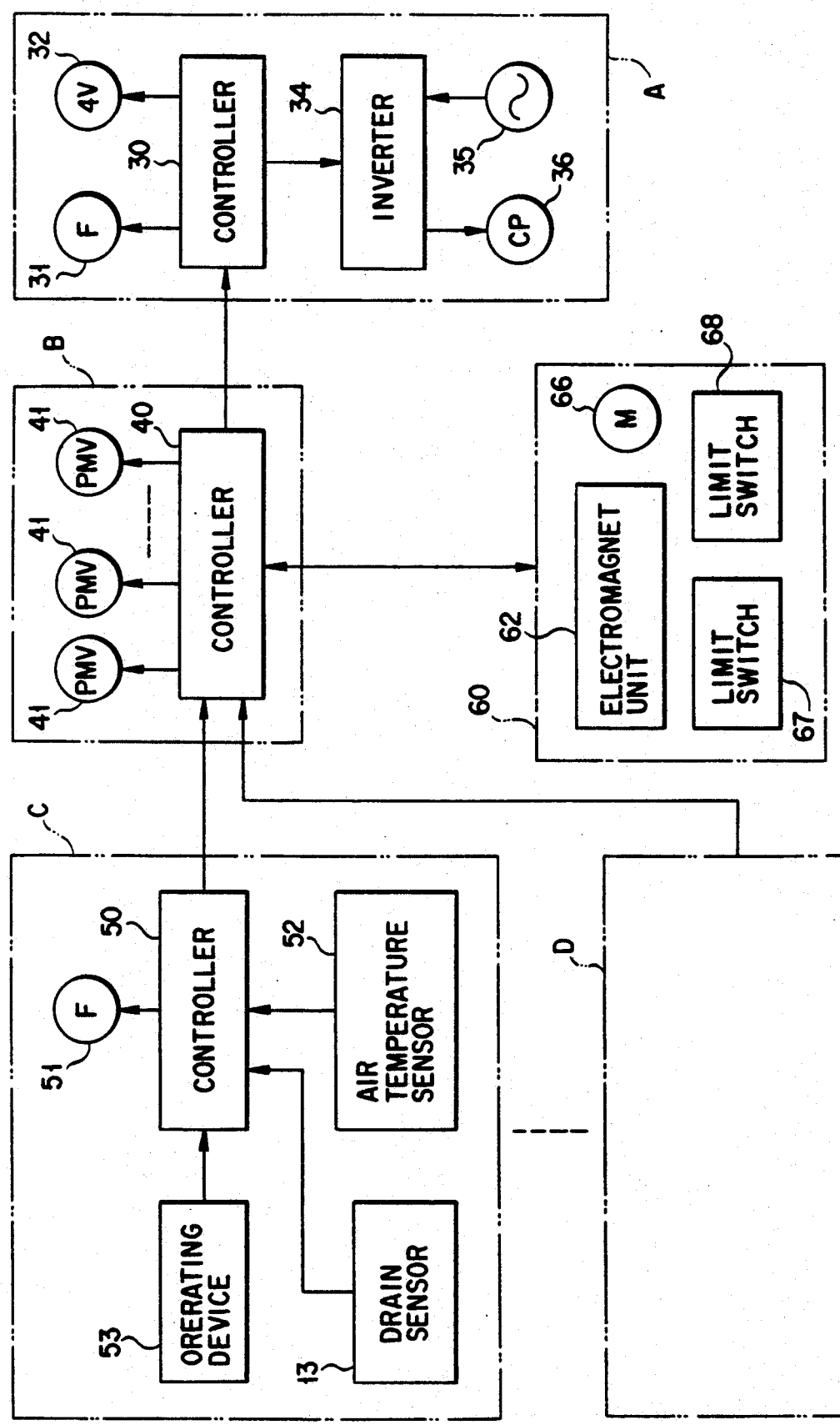

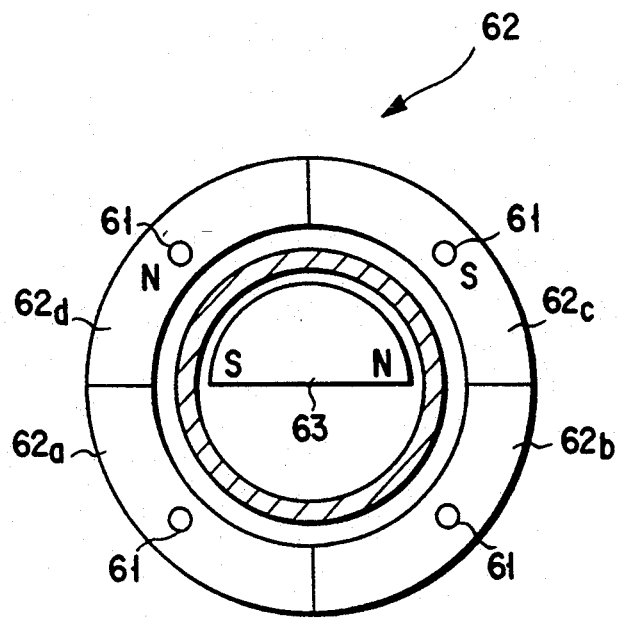
F I G. 12
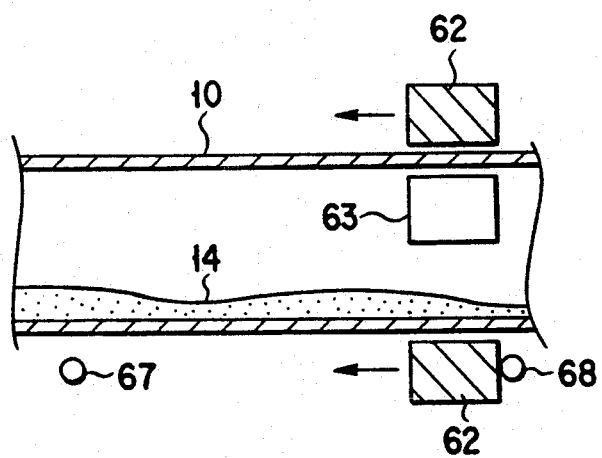
F I G. 13

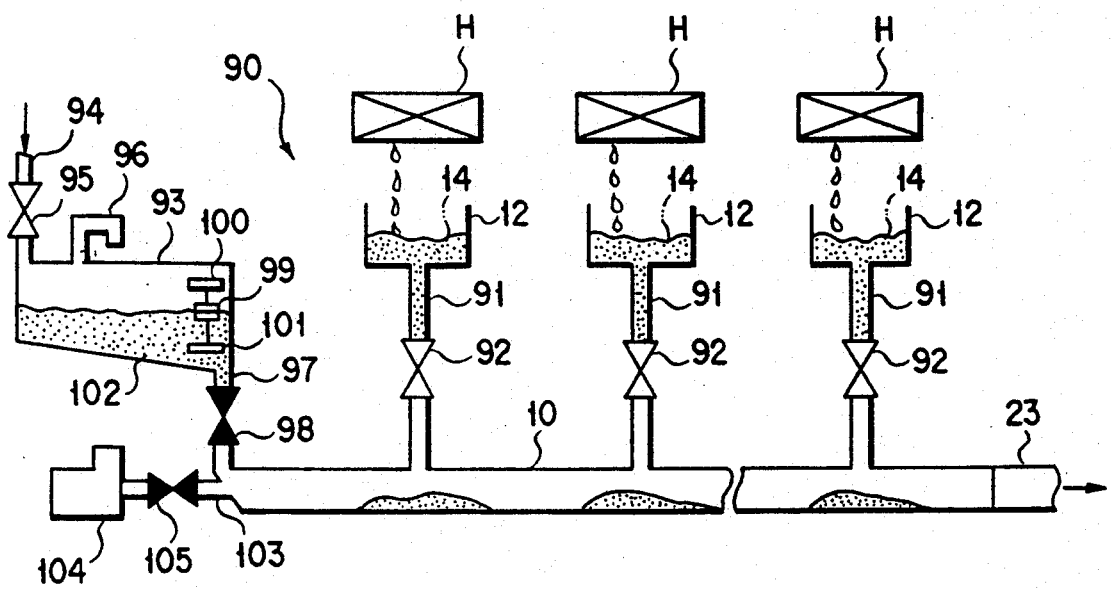
F I G. 19

AIR CONDITIONING APPARATUS WITH INDOOR UNITS INSTALLED ON CEILING AND FLOOR IN ROOM

BACKGROUND OF THE INVENTION

1. Field of the Invention

The present invention relates to a multi-type air conditioning apparatus in which one or more indoor units are connected to an outdoor unit.

2. Description of the Related Art

There is known a multi-type air conditioning apparatus in which two or more indoor units are connected to an outdoor unit. Indoor units include units called personal air conditioninq units, which are used to air-condition indoor spaces individually. The personal air conditioninq units are mounted on, for example, a number of desks placed on the indoor floor.

In installing an air conditioning apparatus equipped with one or more personal air conditioning units in an office in a building, it is a practical method to install a refrigerant pipe and a drain pipe in the underfloor space, the so-called free access floor.

However, the free access floor is prepared to accommodate electrical wiring for computers and business equipment, and its depth is limited to about ten centimeters at most. The depth limit is intended to circumvent bad effects, which would be produced by making the depth of the free access floor too great, such as inconvenient entrance and exit resulting from increased difference in level between a room and a hall, and an oppressive sensation resulting from low ceiling.

Even if a drain pipe is laid down in such a free access floor, it is almost impossible to tilt it. For this reason, dust is liable to accumulate in the drain pipe, and thus the drain pipe can be blocked up.

One way to solve such a problem would be forming an opening in a concrete slab under the free access floor and conducting the drain pipe downstairs through the opening. However, this way would require a new opening to be formed in the concrete slab each time the arrangement of desks on the floor is changed, and an old opening to be stopped up. Therefore, this construction would be very troublesome and time-consuming.

In Japanese Unexamined Patent Publication No. 2(HEISEI)-254237 there is disclosed an air conditioning apparatus in which drainage produced by a cooler is caught by a drainage pan, the drain in the drain pan is conducted into a tank, and the drainage in the tank is evaporated and then exhausted outdoors. A problem with this air conditioning apparatus is that the entire apparatus has to become large because a tank having a built-in drain evaporating means is provided for each of a plurality of coolers.

Moreover, in Japanese Unexamined Utility Model Publication No. 2(HEISEI)- 93620 there is disclosed an air conditioning apparatus in which drain produced by an air conditioning unit mounted on a desk is evaporated by heat of high-temperature refrigerant passing through a refrigerant pipe and then discharged outdoors. In the case of this air conditioning apparatus as well, means for evaporating drainage is needed for each of air conditioning units mounted on desks. Thus, the entire apparatus inevitably becomes large.

Furthermore, in Japanese Unexamined Utility Model Publication No. 2(HEISEI)- 93621 there is disclosed an air conditioning apparatus in which drainage produced by an air conditioning unit mounted on a desk is stored in a tank, and the drainage in the tank is converted into oxygen and hydrogen by means of electrolysis, the oxygen being sent back into the indoor space and the hydrogen being discharged outdoors. In the case of this air conditioning apparatus as well, the entire apparatus becomes large because electrolysis means is needed for each of air conditioning units mounted on desks.

SUMMARY OF THE INVENTION

It is therefore an object of the present invention to provide an air conditioning apparatus which, even under circumstances in which a drain pipe cannot be tilted, permits sure discharge of drainage without accumulation of dust in and blocking up of the drain pipe and making the entire apparatus large.

According to the present invention there is provided an air conditioning apparatus with indoor units installed on ceiling and floor of room, comprising:

a plurality of air heat exchangers for cooling indoor air, eaoh of said air heat exchangers being provided in said indoor units;

a plurality of drainage pans for receiving drain produced by said air heat exchangers, each of said drain pans being provided in said indoor units;

a drainage pipe for receiving drain from each of said drain pans, said drain pipe being provided in said ceiling and under said floor of said room; and a drain carrying unit for carrying the drainage in said drain pipe outdoor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 illustrates the entire arrangement of an air conditioning apparatus of the present invention;

FIG. 2 is a schematic illustration of a first embodiment of the drain carrying unit;

FIG. 8 is a block diagram of a second embodiment of the control circuit;

FIG. 12 illustrates the state in which the magnetic material has moved from the state of FIG. 10;

FIG. 13 illustrates the positional relationship between the electromagnetic unit and the magnetic material in FIG. 12;

FIG. 19 illustrates a fifth embodiment of the drain carrying unit;

DETAILED DESCRIPTION OF THE PREFERRED EMBODIMENTS

Figure 3:
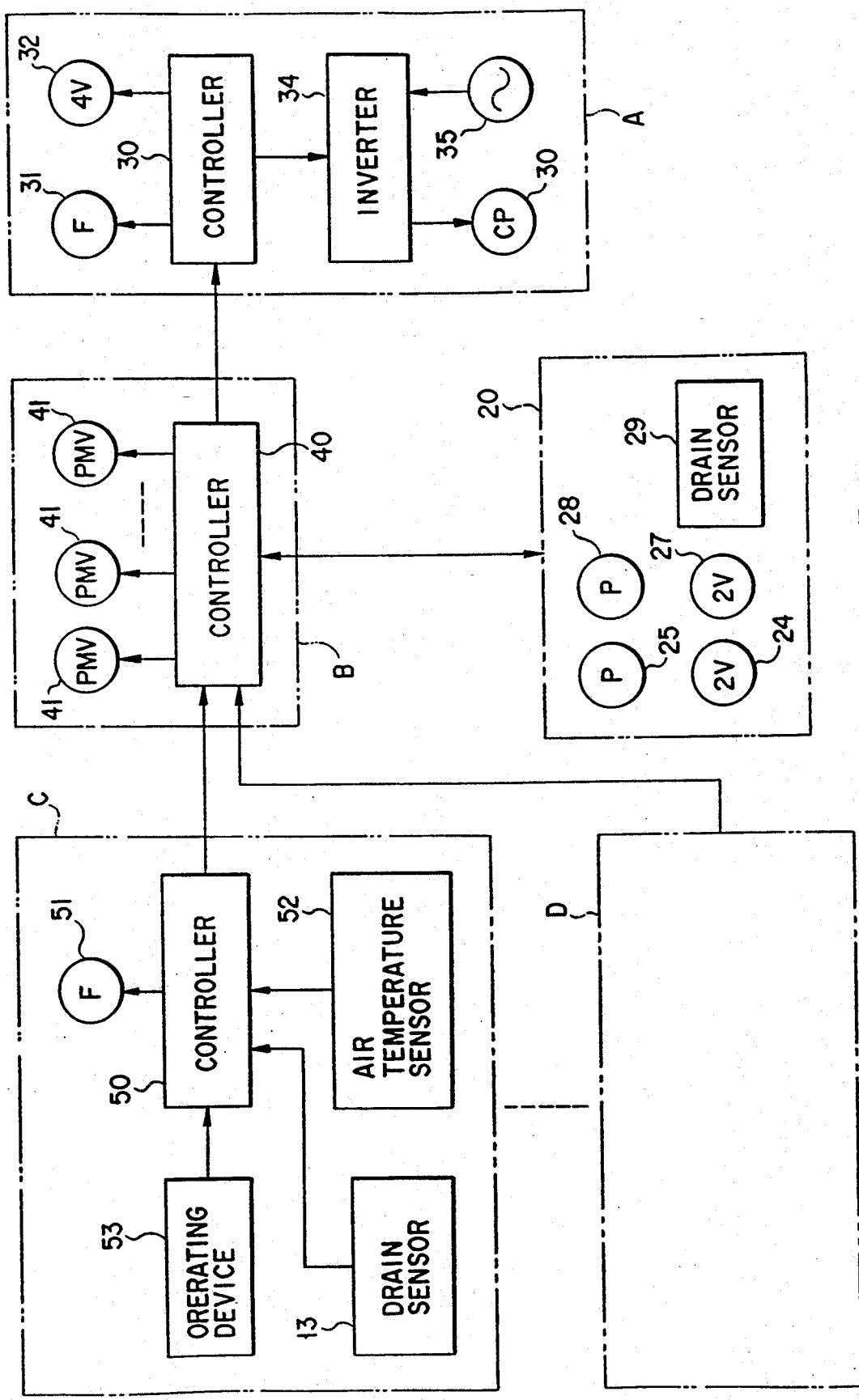
FIG. 3 is a block diagram of a first embodiment of the control circuit.

Referring now to FIG. 1, there is shown a building 1 equipped with two or more rooms 2. Each room is surrounded with a ceiling 3, a floor 4, walls 5, and windows 6. Desks 7 and chairs 8 are placed on the floor.

In the ceiling there is a concrete slab 1a for separation from upstairs rooms, and a space 9 is secured between the slab 1a and the ceiling 3. An indoor unit C is installed in such a way as to be embedded in the ceiling 3 of each room. An indoor unit D is mounted on each of desks 7 on the floor 4. Each of the indoor units D is used to air-condition the space around its respective desk 7 individually, and thus is referred to as a personal air conditioning unit.

Under the floor 4 there is a concrete slab 1a for separation from downstairs rooms, and a space 11 is provided between the slab 1a and the floor 4. The space 11 is referred to as a free access floor, which is originally provided to accommodate electrical wiring for computers and business machines.

A distribution unit B is installed in a free space on the same floor as the rooms 2. Two or more refrigerant pipes 15 are connected to the distribution unit B. Though not shown, some of the refrigerant pipes 15 pass through the space 9 for connection to the indoor units C, while the remaining refrigerant pipes 15 pass through the free access floor 11 for connection to the indoor units D.

An outdoor unit A is put, for example, on the rooftop of the building 1. The distribution unit B is connected to the outdoor unit A by a refrigerant pipe 16. The refrigerant-pipe-connection among the outdoor unit A, the distribution unit B, the indoor units C, and the indoor units D constitutes a refrigerating cycle.

At the time of operation of the refrigerating cycle, a refrigerant flows from the outdoor unit A through the distribution unit B to each of the indoor units C, and the refrigerant then returns from each indoor unit C through the distribution unit B to the outdoor unit A. Thereby, each of the rooms 2 is air-conditioned (cooled or heated) by the indoor unit C. At the same time, the refrigerant flows from the outdoor unit A through the distribution unit B to each of the indoor units D, and the refrigerant then returns from each indoor unit D through the distribution unit B to the outdoor unit A. Thereby, the indoor units D air-condition (cooling or heating) the space around the desks 7 individually.

On the other hand, in the space 9 in the ceiling 3 there is laid a drain pipe 10 to which the indoor units C are connected. Likewise, a drain pipe 10 is laid in the free access floor 11 under the floor 7, to which the indoor units D are connected. As will be described later, the drain pipes 10 are adapted to receive drainage produced by the indoor units C, D and carry it away from the building 1.

In the space in which the distribution unit B is installed there is installed a drain carrying unit 20 to which the drain pipes 10 are connected. The drain carrying unit 20 is adapted to carry drainage in the drain pipes 10 away from the building 1.

In FIG. 2 there is shown an arrangement of the drain carrying unit 20.

First, each of the indoor units C, D is equipped with an air heat exchanger H and a drain pan 12. The air heat exchanger H acts as an evaporator to cool indoor air at the time of cooling operation and as a condenser to heat indoor air at the time of heating operation. At the time of cooling operation, dewdrops form on the surface of the air heat exchanger H acting as an evaporator and fall as drainage. The drain pan 12, which is adapted to receive drain produced by the air heat exchanger H, is connected to the drain pipe 10. The drain pan 12 is equipped with a first drain sensor 13 that detects the amount of drainage.

The drain carrying unit 20 has a tank 21 which has a inflow port 21a formed in the upper portion of its side. The drain pipe 10 is connected to the inflow port 21a. An outflow port 21b is formed in the bottom of the tank 21. A discharge pipe 23 is connected to the outflow port 21b. The discharge pipe 23 is equipped with an electromagnetic two-way valve 27.

An exhaust port 21c is formed in the upper portion of a side of the tank 21. A first pump (an air vent pump) 25 is provided inside the tank 21. The blow-off port of the pump 25 is connected to the exhaust port 21c. To the exhaust port 21c is connected an exhaust pipe 26 that is equipped with an electromagnetic two-way valve 27. In the upper surface of the tank 21 is formed an intake port 21d to which the blow-off port of a second pump (a compressed air supply pump) 28 is externally connected. A second drain sensor 29 that detects the amount of drainage is provided in the bottom of the tank 21.

A control circuit is illustrated in FIG. 3.

The outdoor unit A has a controller 30 comprised of a microcomputer and its associated peripheral circuits. To the controller 30 are connected an outdoor fan 31, a four-way valve 32, and an inverter 34. The outdoor fan 31 supplies outdoor air to an air heat exchangers (not shown). The four-way valve 32 is adapted to switch the flow of the refrigerant between cooling and heating. The inverter 34 rectifies the voltage of a commercial AC source 35 and then converts it to an alternating voltage of a frequency determined by a command from the controller 30. The output of the inverter 34 is used as power for driving the motor of a compressor 36.

The distribution unit B has a controller 40 comprised of a microcomputer and its associated peripheral circuits. To the controller 40 are connected two or more flow control valves 41 using pulse motor valves, and the two-way valves 24, 27, the drain sensor 29 and the pumps 25, 28 of the drain carrying unit 20. The flow control valves 41 each regulate the amount of refrigerant flowing into respective individual indoor units C, D.

Each indoor unit C, D has a controller 50 comprised of a microcomputer and its associated peripheral circuits. To the controller 50 are connected an indoor fan 51, an air-temperature sensor 52, a remote control type operating device 53, and the drain sensor 13. The indoor fan 51 supplies indoor air to the air heat exchanger H. The air-temperature sensor 52 detects temperature Ta of indoor air. The controllers 30, 40, and 50 are connected by signal lines, whereby signal transmission is allowed among them.

The controller 50 of each of the indoor units C, D has the following function means (1) to (3).

(1) Means of sending an operation mode set command (cooling operation set command or heating operation set command), an operation-on command and an operation-off command from the operating device 53 to the distribution unit B.

(2) Means of obtaining the difference $\Delta T$ between a temperature Ta detected by the air-temperature sensor 52 and a room temperature Ts preset with the operating device 53 as air-conditioning load, and then presenting it to the distribution unit B.

(3) Means of making a comparison between the amount of drain detected by the drain sensor 13 and a preset value previously stored in an interna memory and then issuing an intake command to the distribution unit B when the output of the drain detected is above the preset value. This means is a control means of the drain carrying unit 20.

The controller 40 of the distribution unit B has the following function means (1) to (5).

(1) Means of controlling the opening of each flow control valve 41 in accordance with the air-conditioning load on each indoor unit C, D.

(2) Means of determining a mode of operation in accordance with the operation mode set command from each indoor unit C, D, and then presenting it to the outdoor unit A.

(3) Means of obtaining the total amount of the air-conditioning load on the indoor units C, D.

(4) Means of operating the pump 25 in the drain carrying unit 20 with the two-way valve 27 open and the two-way vave 24 closed for a fixed period of time t1 after receipt of an intake command from at least one of the indoor units C, D. This means is a control means of the drain carrying unit 20.

(5) Means of operating the pump 28 with the two-way valve 24 open and the two-way valve 27 closed for a fixed period of time t2 when the amount of drain detected by the drainage sensor 29 exceeds the preset value stored in the internal memory. This means is a control means of the drain carrying unit 20.

The controller 30 of the outdoor unit A has the following function means (1) to (2).

(1) Means of switching the four-way valve 22 in accordance with an operation mode determined by the distribution unit B.

(2) Means of controlling the output frequency of the inverter 34 in accordance with the total amount of air-conditioning load obtained by the distribution unit B.

Figure 4:
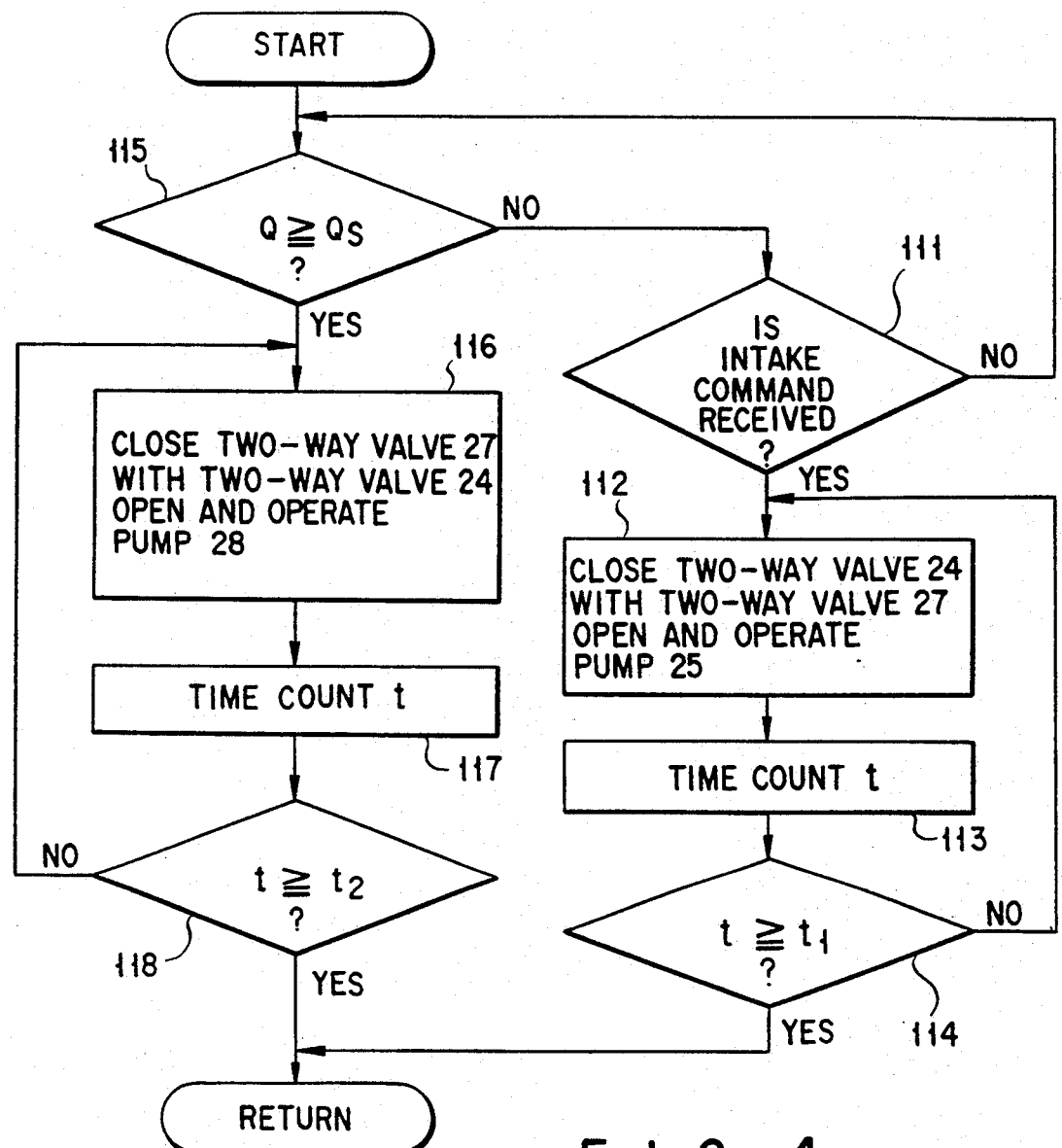
FIG. 4 is a flowchart illustrating the operation of the drain carrying unit of FIG. 2.

Next, reference will be made to a flowchart of FIG. 4 to describe the operation of the apparatus constructed as described above.

At the time of cooling operation, the compressor 36 of the outdoor unit A is activated, so that refrigerant flows from the outdoor unit A through the distribution unit B to the indoor units C, D. Thus, each room is cooled by a corresponding indoor unit C, and the space around each desk 7 is cooled by a respective individual indoor unit D. At this point, dewdrops form on the heat exchanger H of each indoor unit C, D and fall into the drainage pan 12 as drain.

When the amount of drainage in the drain pan 12, detected by the drain sensor 13, exceeds the preset value, an intake command is sent from a corresponding indoor unit to the distribution unit B.

When the intake command is issued (step 111), the two-way valve 24 of the drain carrying unit 20 is closed with the two-way valve 27 open, and the pump 25 is operated (step 112). In this case, the air in the tank 21 is exhausted to outside through the exhaust pipe 26, so that negative pressure is produced in the tank 21. The negative pressure is applied to the drain pipe 10 through the inflow port 21a. Thereby, the drainage in the drain pan 12 flows into the drain pipe 10 and is then sucked into the tank 21.

At this point, time count t is being carried out by the controller 40 in the distribution unit B (step 112). The above operation is continued until the time count t reaches a fixed time t1 (step 113 and 114). When the time count t reaches the fixed time t1, the two-way valve 24 is opened, and the pump 25 is stopped.

On the other hand, the amount Q of drainage which has collected in the tank 21 is detected by the drain sensor 29. When the amount Q of drainage reaches a preset value Qs (step 115), the two-way valve 27 is closed with the two-way valve 24 open, and the pump 28 is operated (step 116). In this case, compressed air is supplied into the tank 21, and the drainage in the tank 21 is pressure discharged to outside of the building 1 through the discharge pipe 23.

At this point, the time count t is being carried out by the controller 40 in the distribution unit B (step 117). The above operation is continued until the time count t reaches a fixed time t2. When the time count t reaches the time t2, the two-way valve 27 is opened, and the pump 28 is stopped.

As described above, even if the depth of the free access foor 11 is small and thus the drain pipe 10 cannot be titled, sure discharge of drainage can be performed without accumulation of dust in and blocking up of the drain pipe by feeding drainage produced by each indoor unit C, D into the drain pipe 10 and carrying the drainage forcedly using air pressure. In addition, there is no need of construction to form a drain-pipe conducting opening in the concrete slab la, which lightens installation work and eases maintenance service. The arrangement to carry drainage produced by all the indoor units C, D by the use of a single drain carrying unit 20 permits down-sizing of the apparatus, as opposed to the prior art in which carrying mean is provided for each of coolers.

Next, a second embodiment of the present invention will be described.

Figure 5:
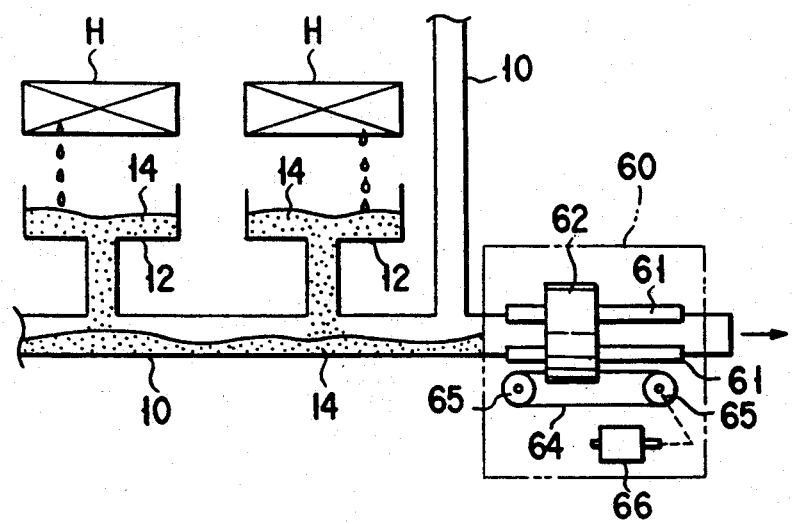
FIG. 5 is a schematic illustration of a second embodiment of the drain carrying unit.

The second embodiment uses such a drain carrying unit 60 as shown in FIG. 5. That is, several rails 61 are installed in positions to surround the drain pipe 10 and in the direction of the length of the drain pipe. An electromagnet unit 62 is movably attached to the rails 61. A circular belt 64 is attached to the electromagnet unit 62. A pair of rollers 65 and 66 is connected by the belt 64. A motor 66 has its drive shaft coupled with the roller 65. That is, reversing of the direction of rotation of the motor 66 permits reciprocation of the electromagnet unit 62 along the drain pipe 10.

The electromagnet unit 62 has rear and front limits of its travel. A limit switch 67 is provided at the rear limit, and a limit switch 68 is provided at the front limit. That is, the limit switch 67 is turned on when the electromagnet unit 62 reaches the rear limit of its travel, while the limit switch 68 is turned on at the front limit of travel of the electromagnet unit 62.

Figure 7:
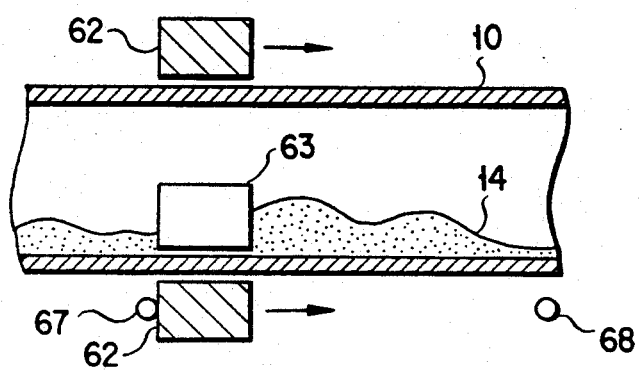
FIG. 7 illustrates a positional relationship between the electromagnetic unit of FIG. 6 and a magnetic material along a longitudinal line of the drain pipe.
Figure 6:
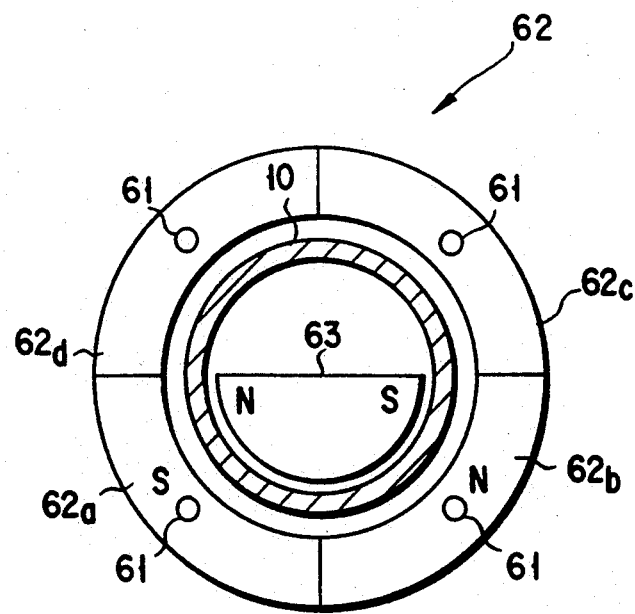
FIG. 6 illustrates an arrangement of the principal part of FIG. 5.

The electromagnet unit 62, as shown in FIGS. 6 and 7, is constructed from magnetic cores 62a, 62b, 62c, 62d that are arranged in circular form around the drain pipe 10. Selective setting of polarity (N pole, S pole) is made possible with the magnetic cores 62a, 62b, 62c, 62d. In FIG. 6, the magnetic core 62a is magnetized to S pole, while the magnetic pole 62b is magnetized to N pole.

In the drain pipe 10 there is provided a magnetic material, for example, a permanent magnet 63 so that it can move. The permanent magnet 63 has a semicircular cross section, with its curved surface set in contact with the internal surface of the drain pipe 10, and has N pole and S pole at its both ends in the direction opposite to the direction of the length of the pipe. That is, with the magnetic core 62a set to S pole and the magnetic core 62b set to N pole, the permanent magnet 63 will be present, as shown in FIG. 6, in the bottom of the drain pipe because of attraction between the magnetic poles 62a, 62b and the permanent magnet 63.

A control circuit is shown in FIG. 8.

To the controller 40 of the distribution unit B are connected the electromagnet unit 62, the motor 66, and the limit switches 67 and 68 of the drain carrying unit 60.

The controller 40 has the following function means (1) to (4).

(1) Means of controlling the opening of each flow control valve 41 in accordance with the air-conditioning load on each indoor unit C, D.

(2) Means of determining a mode of operation in accordance with the operation mode set command from each indoor unit C, D, and then presenting it to the outdoor unit A.

(3) Means of obtaining the total amount of the air-conditioning load on the indoor units C, D.

(4) Means of reciprocating the electromagnet unit 62 during operation while changing the polarities of the magnetic cores 62a, 62b, 62c, 62d.

In other points the second embodiment is the same as the first embodiment.

Figure 9:
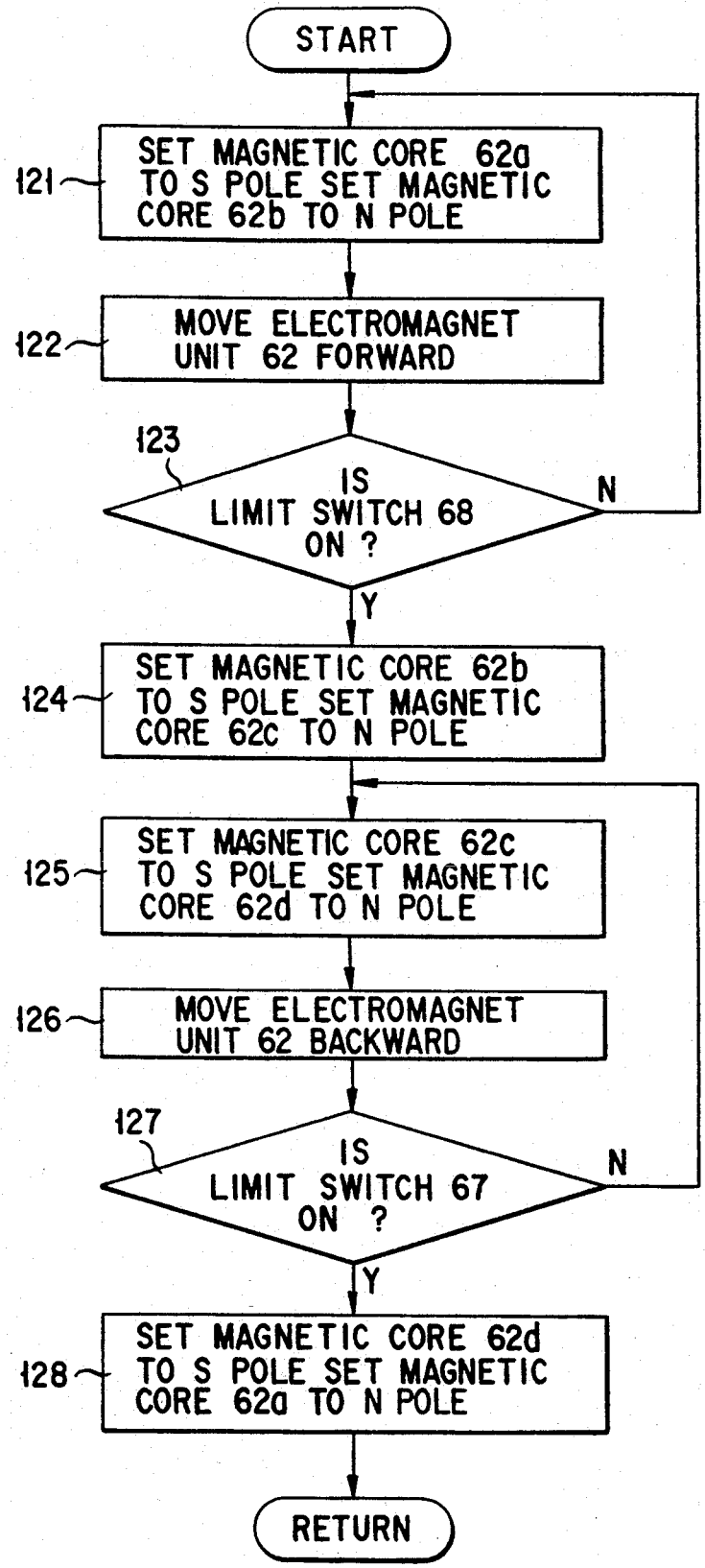
FIG. 9 is a flowchart illustrating the operation of the second embodiment of the drain carrying unit.

The operation will be described with reference to a flowchart of FIG. 9.

First, as shown in FIGS. 6 and 7, the magnetic cores 62a and 62b of the electromagnet unit 62 are set to S pole and N pole, respectively, during operation (step 121). At this point, the permanent magnet 63a is present in the bottom of the drain pipe 10 as a result of being attracted by the magnetic cores 62a and 62b. In this state the electromagnet unit 62 moves forward (step 122).

When the electromagnet unit 62 moves forward, the permanent magnet 63 moves forward while it is attracted to the bottom of the drain pipe 10. When the permanent magnet 63 moves forward, drainage collected in the bottom of the drain pipe 10 is pushed forward (in the direction of discharge) by the permanent magnet 63. The movement of the permanent magnet 63 permits the discharge of drainage to the outside of the building 1.

Figure 10:
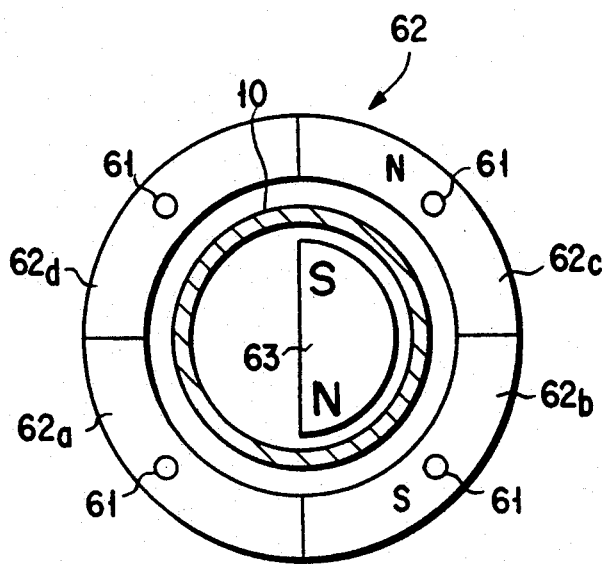
FIG. 10 illustrates the state in which the magnetic material has moved from the state of FIG. 7.
Figure 11:
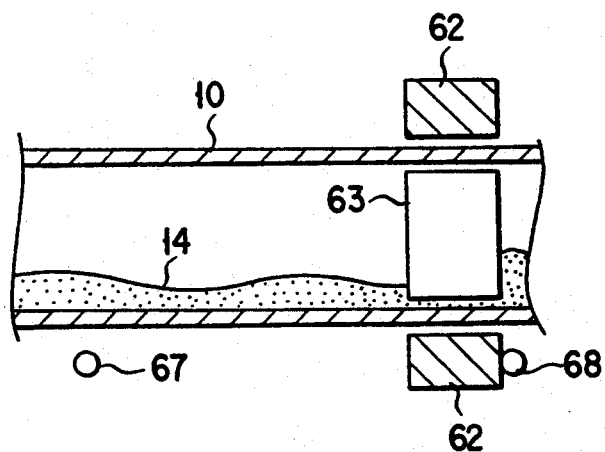
FIG. 11 illustrates the positional relationship between the electromagnetic unit and the magnetic material in FIG. 10.

When the limit switch 68 is turned on at the forward limit of travel of the electromagnet unit 62 (step 123), the magnetic cores 62b and 62c of the electromagnet unit 62 are set to S pole and N pole, respectively, as shown in FIGS. 10 and 11 (step 124). Thereby, the magnetic poles 62b and 62c attract the permanent magnet 63 so that it will face the side of the drain pipe 10.

Subsequently, as shown in FIGS. 12 and 13, the magnetic cores 62c and 62d of the electromagnet unit 62 are set to S pole and N pole, respectivey (step 125). Thereby, the magnetic cores 62c and 62d attract the permanent magnet 63, so that it rotatcs to face the upper portion of the drain pipe 10. In this state the electromagnet unit 62 is moved backwards (step 126).

When the electromagnet unit 62 moves backward, the permanent magnet 63 moves backward while being attracted to the upper portion of the drainage pipe. At this point, drainage will not be moved backward because the permanent magnet 63 stays upwards.

When the limit switch 67 is turned on at the rear limit of travel of the electromagnet unit 62 (step 127), the magnetic cores 62d and 62a of the electromagnet unit 62 are set to S pole and N pole, respectivey (step 128). In this state the electromagnet unit 62 is moved forwards (step 122), thereby discharging drainage again.

As described above, even if the depth of the free access floor 11 is small and thus the drain pipe 10 cannot be titled, pushing of drainage in the drain pipe 10 by the movement of the permanent magnet 63 permits sure discharge of drainage without accumulation of dust in and blocking up of the pipe. In addition, there is no need of construction to form a drain-pipe conducting opening in the concrete slab 1a, which lightens installation work and eases maintenance service. The arrangement to carry drainage produced by all the indoor units C, D by the use of a single drain carrying unit 60 permits down-sizing of the apparatus, as opposed to the prior art in which carrying means is provided for each of coolers.

Next, a third embodiment of the present invention will be described.

Figure 14:
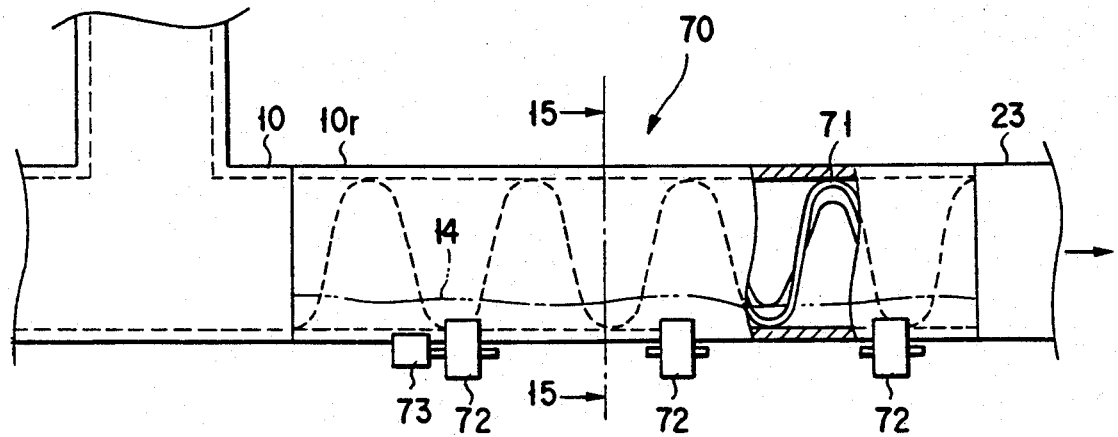
FIG. 14 illustrates a third embodiment of the drain carrying unit.

As shown in FIG. 14, the third embodiment uses a drain carrying unit 70 in which a portion 10r of the drain pipe 10 is made rotatable. Several rollers 72 are kept in contact with the outer surface of the rotatable portion 10r, one of the rollers being coupled with the drive shaft of a motor 73. On the internal surface of the rotatable portion 10r is formed a blade 71 that extends spirally along the axis of the drain pipe 10.

Figure 15:
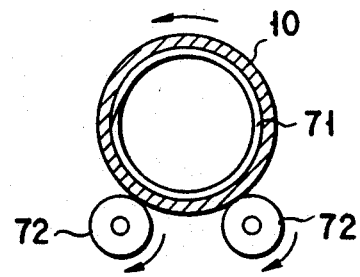
FIG. 15 is a cross-sectional view taken along line 15—15 of FIG. 14.
Figure 16:
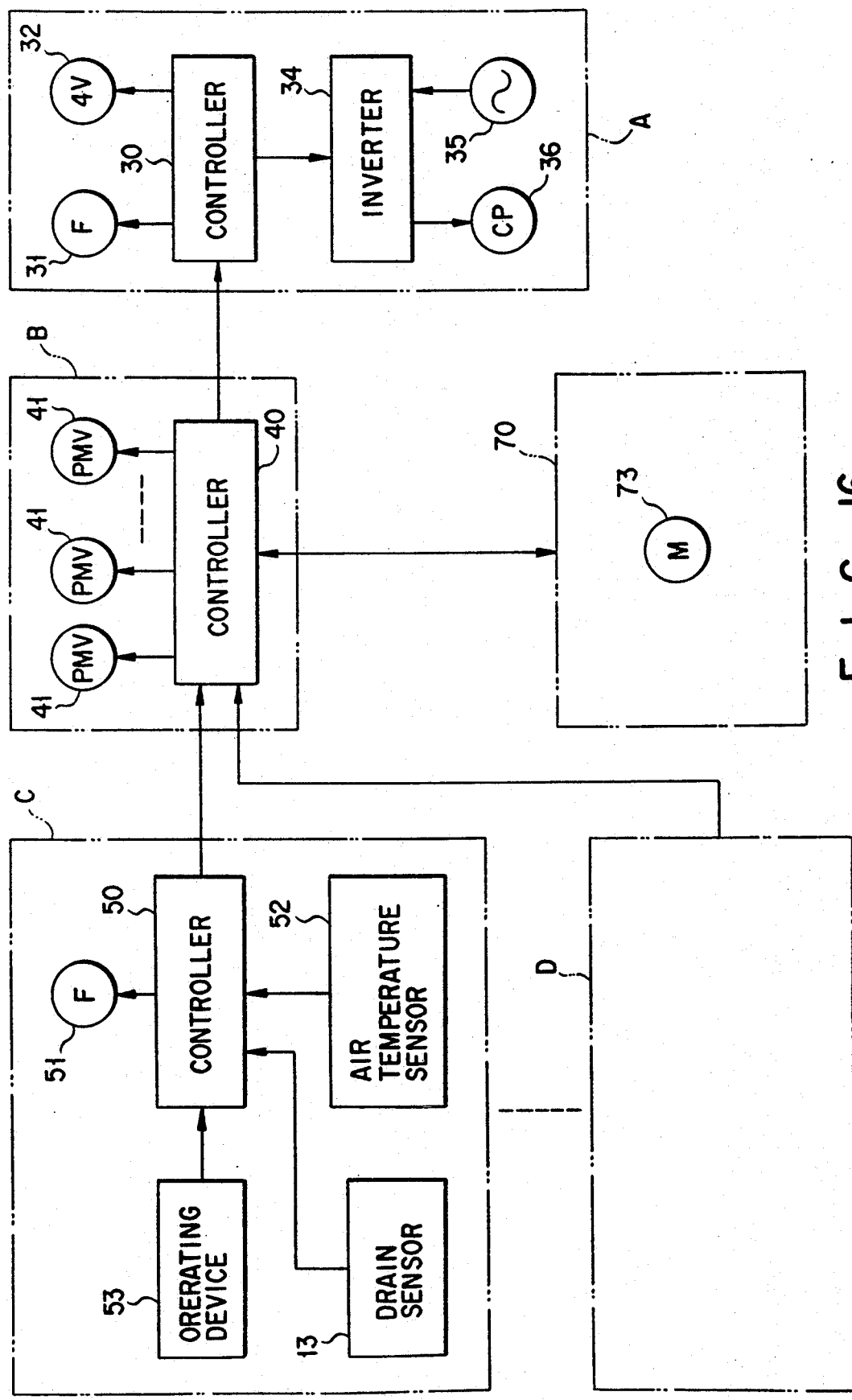
FIG. 16 is a block diagram illustrating a third embodiment of the control circuit.

A control circuit is shown in FIG. 15.

The motor 73 of the drain carrying unit 70 is connected to the controller 40 of the distribution unit B.

The controller 40 has the following function means (1) to (4).

(1) Means of controlling the opening of each flow control valve 41 in accordance with the air-conditioning load on each indoor unit C, D.

(2) Means of determining a mode of operation in accordance with the operation mode set command from each indoor unit C, D, and then presenting it to the outdoor unit A.

(3) Means of obtaining the total amount of the air-conditioning load on the indoor units C, D.

(4) Means of operating the motor 73 of the drain carrying unit 70 during operation.

In other points the third embodiment is the same as the first and second embodiments.

The operation of the third embodiment will be described.

In operation, the motor 73 operates to rotate the roller 72. The rotation of the roller 72 is transmitted to the rotatable portion 10r of the drain pipe 10. Thus, the rotatable portion is rotated.

When the rotatable portion 10r rotates, drainage in the drain pipe is pushed forward (in the direction of discharge) by the action of the spiral blade 71. Thereby, the drain is discharged to the outside of the building 1.

As described above, even if the depth of the free access floor 11 is small and thus the drain pipe 10 cannot be titled, carrying drainage in the drain pipe 10 by the rotation of the rotatable portion 10 permits sure discharge of drainage without accumulation of dust in and blocking up of the pipe. In addition, there is no need of construction to form a drain-pipe conducting opening in the concrete slab 1a, which lightens installation work and eases maintenance service. The arrangement to carry drainage produced by all the indoor units C, D by the use of a single drain carrying unit 70 permits down-sizing of the apparatus, as opposed to the prior art in which carrying means is provided for each of coolers.

Next, a fourth embodiment of the present invention will be described.

Figure 17:
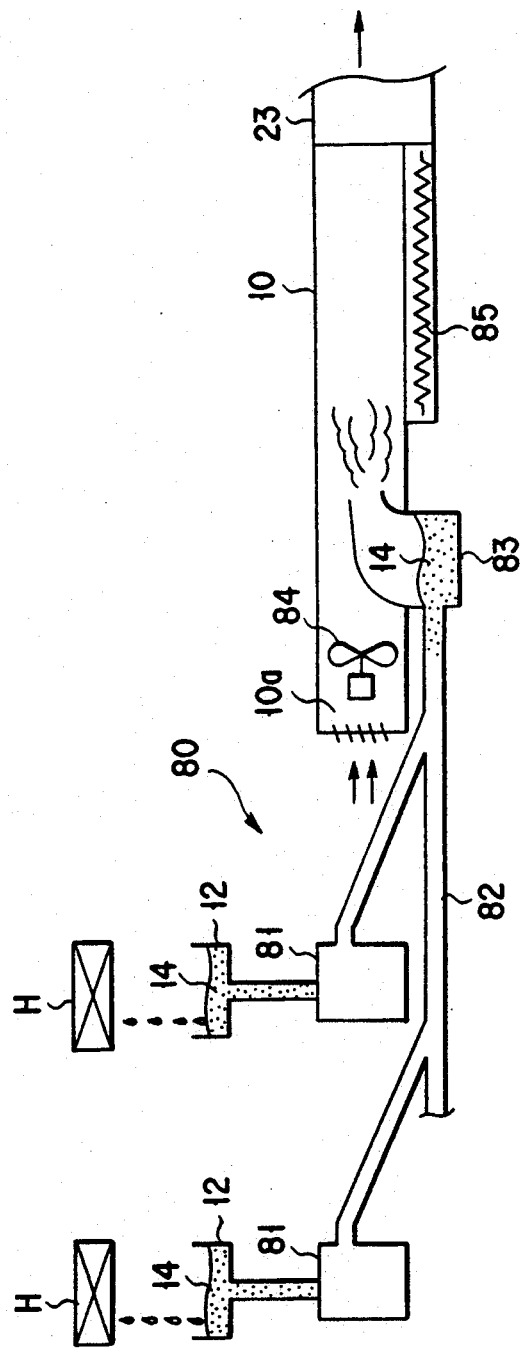
FIG. 17 illustrates a fourth embodiment of the drain carrying unit.

As shown in FIG. 17, the fourth embodiment uses a drain carrying unit 80 in which a filter 81 is provided at the discharge port of each drain pan 12. The filter 81 is adapted to remove dust from drain.

The exit of each filter 81 is connected to a atomizer, for example, an ultrasonic humidifier 83, through a pipe 82. The ultrasonic humidifier 83 uses ultrasonic vibration to convert drainage into mist for subsequent spout out.

The exhaust nozzle of the ultrasonic humidifier 83 is introduced into the drain pipe 10. A fan 84 is provided in the neighborhood of the intake port 10a of the drain pipe 10. The fan 84 serves to send mist spout out from the exhaust port of the humidifier 83 in the direction of discharge. An electric heater 10 is provided in the bottom of the drain pipe 10 ahead of the exhaust port of the humidification device 83. The heater serves to heat the drain pipe 10.

Figure 18:
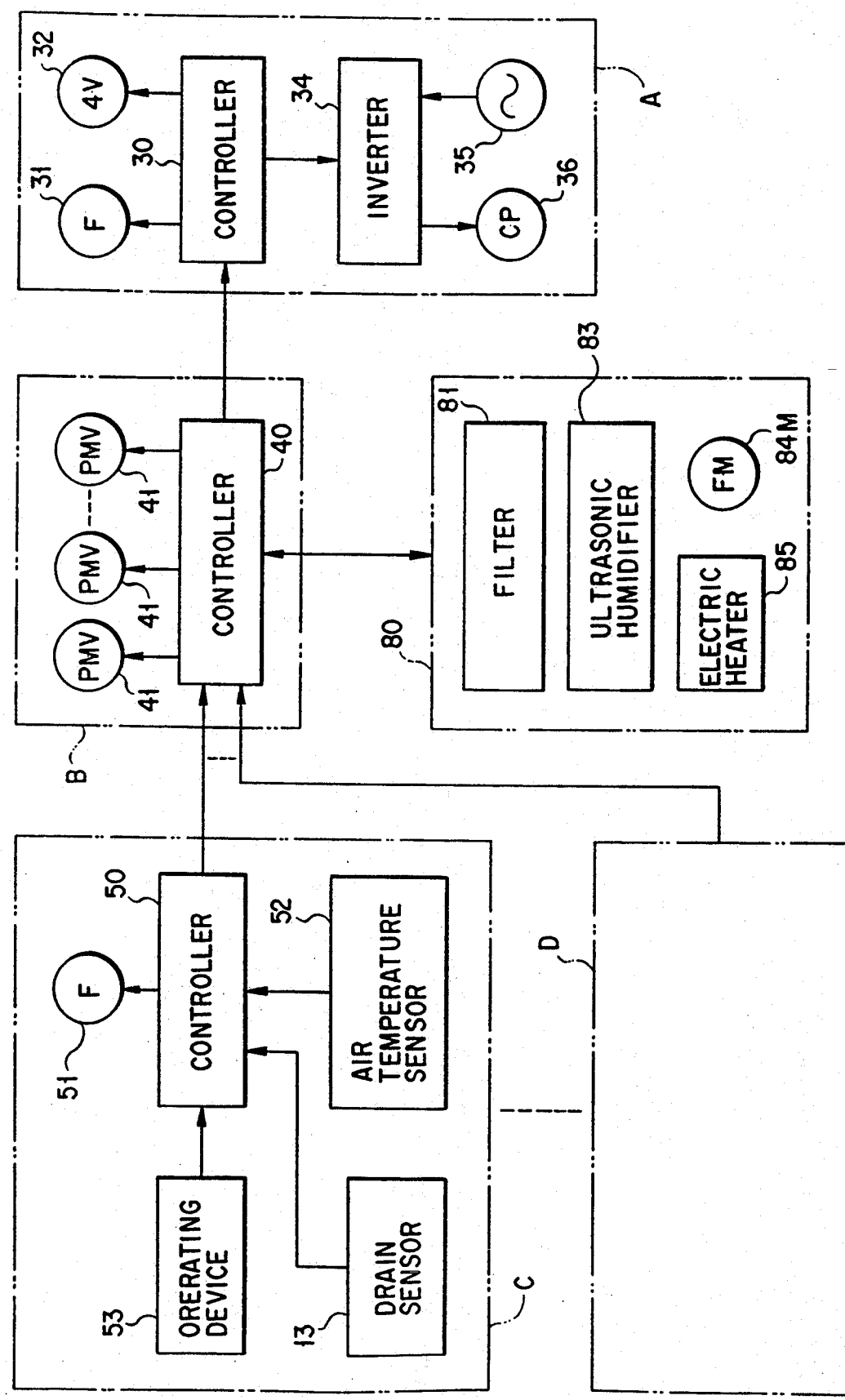
FIG. 18 is a block diagram illustrating a fourth embodiment of the control circuit.

A control circuit is illustrated in FIG. 18.

To the controller 40 of the distribution unit B are connected the filter 81, the ultrasonic humidifier 83, the fan 84, and the electric heater 85.

The controller 40 has the following function means (1) to (4).

(1) Means of controlling the opening of each flow control valve 41 in accordance with the air-conditioning load on each indoor unit C, D.

(2) Means of determining a mode of operation in accordance with the operation mode set command from each indoor unit C, D, and then presenting it to the outdoor unit A.

(3) Means of obtaining the total amount of the air-conditioning load on the indoor units C, D.

(4) Means of operating the ultrasonic humidifier 83 and the fan 84 and energizing the electric heater 84 during operation.

In other points the fourth embodiment is the same as the first, second and third embodiments.

The operation of the fourth embodiment will be described.

During operation, drainage in the drain pan 12 is subjected to dust filtering by the filter 81, and then flows through the pipe 82 into the ultrasonic humidifier 83. The drainage is converted into mist by the humidifier and then flows into the drain pipe 10. The mist is blown off by the fan 84 in the direction of discharge. The drain pipe 10 is heated by the electric heater 85 so that drops of water, formed by mist becoming cool, may not form on the inner surface of the drain pipe 10. Thereby, the drainage an surely be discharged to the outside of the building 1.

As described above, even if the depth of the free access floor 11 is small and thus the drain pipe 10 cannot be titled, carrying drain in the Drainge pipe 10 in the form of mist permits sure discharge of drainage without accumulation of dust in and blocking up of the pipe. In addition, there is no need of construction to form a drain-pipe conducting opening in the concrete slab 1a, which lightens installation work and eases maintenance service. The arrangement to carry drainage produced by all the indoor units C, D by the use of a single drain carrying unit 80 permits down-sizing of the apparatus, as opposed to the prior art in which carrying means is provided for each of coolers.

Next, a fifth embodiment of the present invention will be described.

As shown in FIG. 19, the fifth embodiment uses a drain carrying unit 90 in which the discharge port of each drain pan 12 is connected to the drain pipe 10 through a pipe 91. The pipe 91 is equipped with an electromagnetic two-way valve 92.

There is a tank 93 which supplies water to the drain pipe 10. The upper portion of the tank 93 is connected to waterworks (not shown) through a water-supply pipe 94. The water-supply pipe 94 is equipped with an electromagnetic two-way valve 95. The upper portion of the tank 93 opens to the air through an intake port 96. The lower portion of the tank 93 is connected to the end of the drain pipe 10 through a water-supply pipe 97. The water-supply pipe 97 is equipped with an electromagnetic two-way valve 98.

In the tank 93 there is a float 99 that is movable in an up-and-down direction. A upper and lower limit switches 100 and 101 are provided above and below the float 99, respectively. The limit switches are each turned on by the float coming in contact therewith and serve as a detector for sensing the amount of water 102 in the tank 93.

To an end of the drain pipe 10 is connected an end of an air-introducing pipe 103 the other end of which is connected to a compressed-air-supply pump 104. The air-introducing pipe 103 is equipped with an electromagnetic two-way valve 105.

Figure 20:
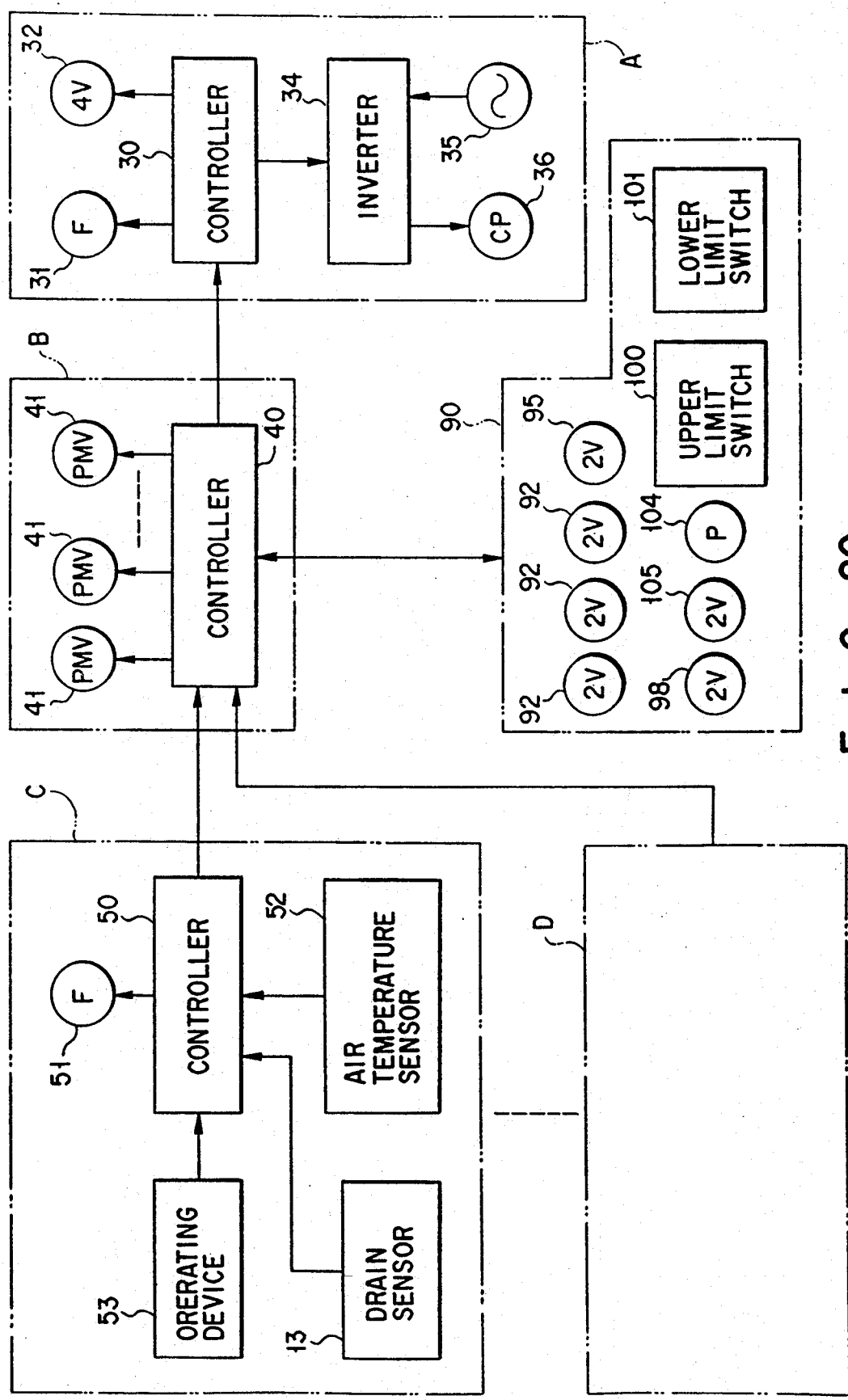
FIG. 20 is a block diagram illustrating a fifth embodiment of the control circuit.

A control circuit is illustrated in FIG. 20.

To the controller 40 of the distribution unit B are connected the two-way valves 92, 95, 98, and 105, the pump 104, the upper and lower limit switches 100 and 101 of the drain carrying unit 90.

The controller 40 has the following function means (1) to (4).

(1) Means of controlling the opening of each flow control valve 41 in accordance with the air-conditioning load on each indoor unit C, D.

(2) Means of determining a mode of operation in accordance with the operation mode set command from each indoor unit C, D, and then presenting it to the outdoor unit A.

(3) Means of obtaining the tota amount of the air-conditioning load on the indoor units C, D.

(4) Means of regularly operating the drain carrying unit 90 during operation.

In the other points the fifth embodiment is the same as the first, second, third and fourth embodiments.

Figure 21:
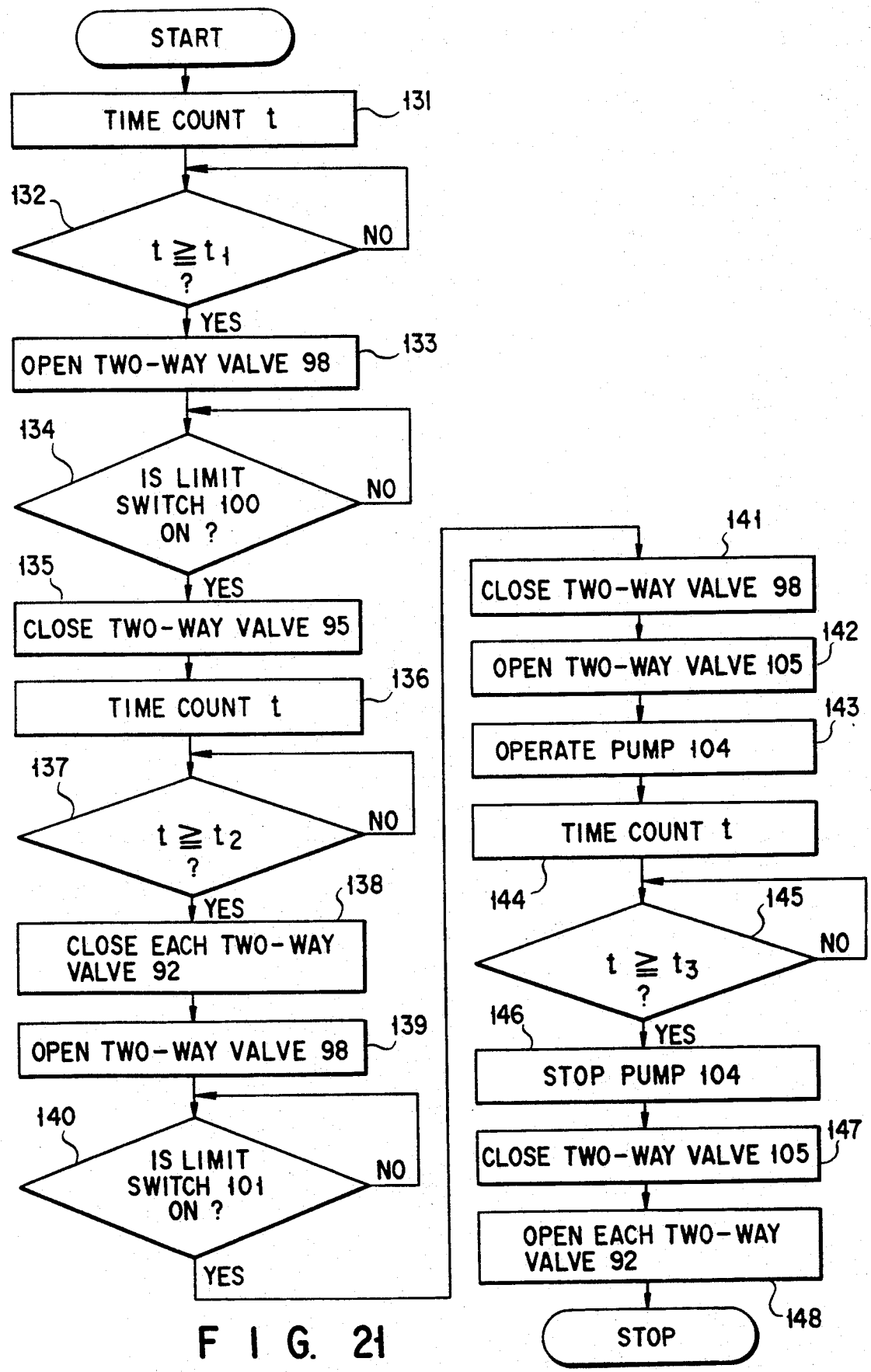
FIG. 21 is a flowchart illustrating the operation of the fifth embodiment of the drain carrying unit.

The operation of the fifth embodiment will be described with reference to a flowchart of FIG. 21.

During operation time count t is carried out by the controller 40 (step 131), and a comparison is made between the time count t and a fixed time t1 which has been stored in the internal memory beforehand (step 132).

When the comparison indicates equality (YES in step 132), the two-way valve 95 is opened (step 133) as shown in FIG. 19, so that water is supplied to the tank 93. At this point, each of the two-way valves 92 is open, so that drainage 14 in the drain pan 12 flows into the drain pipe 10. In FIG. 19, the open state of each two-way valve is indicated by a white symbo, while the closed state of it is indicated by a black symbol.

When the tank 93 is filled with water, the float 99 comes in contact with the upper limit switch 100, so that the switch is turned on (YES in step 134). At this point, the two-way valve 95 is closed (step 135) with the result that the supply of water is stopped. In this state, the time count t is initiated (step 136), and then a comparison is made between the time count t and a fixed time t2 which has been stored in the internal memory beforehand (step 137).

Figure 22:
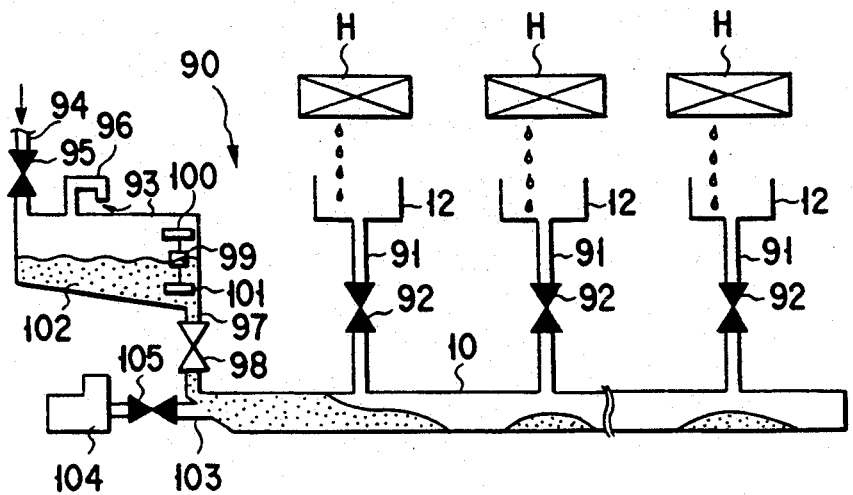
FIG. 22 illustrates the movement of drain in FIG. 19.

When the comparison indicates equality (YES in step 137), all the two-way valves 92 are closed (step 138), and the two-way valve 98 is opened (step 139) as shown in FIG. 22. When the two-way valve 98 is opened, the water in the tank 93 flows into the drain pipe 10 with great force. This permits drainage stored in the drain pipe 10 to be forced to run under pressure in the direction of discharge. At this point, air flows into the tank 93 through the intake port 96, so that water is allowed to flow out smoothly. Note that the purpose of closing all the two-way valves 9 is to prevent water from flowing backward to the drain pan 12.

Figure 23:
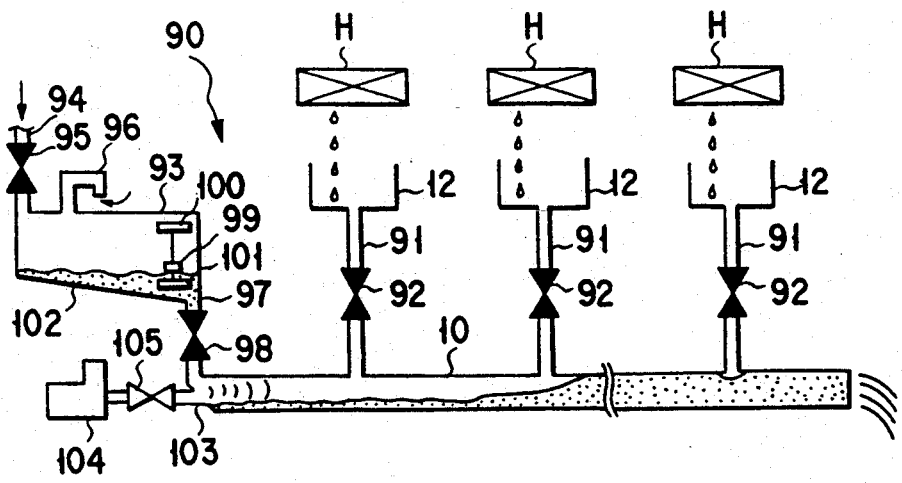
FIG. 23 illustrates the movement of drain in FIG. 19.

When the water in the tank 93 decreases to the level at which the float 99 touches the lower limit switch 101, the limit switch is turned on (YES in step 140). At this point, as shown in FIG. 23, the two-way valve 98 is closed (step 141), while the two-way valve 105 is opened (step 142). At the same time, the pump 104 is operated (step 143). When the pump 104 is operated, compressed air is forced to flow into the drain pipe 10, so that water and drainage in the drain pipe are forced to run under pressure in the direction of discharge.

At this point, time count t is carried out (step 144), and comparison is made between the time count t and a fixed time t3 (step 145). When the comparison indicates equality (YES in step 145), the operation of the pump 104 is stopped (step 146). At the same time, the two-way valve 105 is closed (step 147), while all the two-way valves 92 are opened (step 148) as shown in FIG. 19.

As described above, even if the depth of the free access floor 11 is small and thus the drain pipe 10 cannot be titled, forcing drainage in the drain pipe 10 to run under pressure by means of pouring of water and forcing of compresses air into the drain pipe permits sure discharge of drainage without accumulation of dust in and blocking up of the pipe. In addition, there is no need of construction to form a drain-pipe conducting opening in the concrete slab 1a, which lightens installation work and eases maintenance service. The arrangement to carry drainage produced by all the indoor units C, D by the use of a single drain carrying unit 80 permits down-sizing of the apparatus, as opposed to the prior art in which carrying means is provided for each of coolers.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An air conditioning apparatus with indoor units installed on ceiling and floor of a room, comprising:
   a plurality of air heat exchangers for cooling indoor air, each of said air heat exchangers being provided in said indoor units;
   a plurality of drain pans for receiving drainage produced by said air heat exchangers, each of said drain pans being provided in said indoor units;
   a drain pipe for receiving drainage from each of said drain pans, said drain pipe being provided in said ceiling and under said floor of said room; and
   a drain carrying unit for carrying the drainage in said drain pipe outdoors, said drain carrying unit comprising:
      a plurality of first drain sensors for detecting the amounts of drainage in said drain pans;
      a tank for collecting drainage in said drain pipe;
      a discharge pipe for discharging drainage collected in said tank;
      a two-way valve provided in said discharge pipe;
      a first pump for letting air out of said tank;
      a second pump for letting compressed air into said tank;
      a second drain sensor for detecting the amount of drainage in said tank;
      means for closing said two-way valve and operating said first pump when at least one of said first drain sensors indicates that the amount of drainage is above a preset value; and
      means for opening said two-way valve and operating said second pump when the amount of drainage detected by said second drain sensor is above a preset value.

2. An air conditioning apparatus with indoor units installed on ceiling and floor of a room, comprising:
   a plurality of air heat exchangers for cooling indoor air, each of said air heat exchangers being provided in said indoor units;
   a plurality of drain pans for receiving drainage produced by said air heat exchangers, each of said drian pans being provided in said indoor units;
   a drain pipe for receiving drainage from each of said drain pans, said drain pipe being provided in said ceiling and under said floor of said room; and
   a drain carrying unit for carrying the drainage in said drain pipe outdoors, said drain carrying unit comprising:
      a magnetic material movable in said drain pipe;
      an electromagnetic unit for attracting said magnetic material, said electromagnetic unit being provided to surround said drain pipe; and
      means for reciprocating said electromagnetic unit in the direction of the length of said drain pipe.

* * * * *